United States Patent

[11] 3,601,114

[72] Inventor Arnold M. Cook
 Holden, Mass.
[21] Appl. No. 792,702
[22] Filed Jan. 21, 1969
[45] Patented Aug. 24, 1971
[73] Assignee Norton Company
 Worcester, Mass.

[54] METHOD AND APPARATUS FOR CUTTING COMPLEX SHAPES
 14 Claims, 5 Drawing Figs.

[52] U.S. Cl. .................................................. 125/19,
 143/16
[51] Int. Cl. .................................................. B28d 1/02,
 B27b 19/02
[50] Field of Search .......................................... 125/12, 16,
 19; 143/16; 144/33

[56] References Cited
 UNITED STATES PATENTS
 60,999 1/1867 Colwell ........................ 143/16

| 596,568 | 1/1898 | Borrer .......................... | 143/16 |
| 79,351 | 6/1868 | Hine ............................. | 143/16 |
| 305,705 | 9/1884 | Mueller ......................... | 143/16 |
| 1,284 | 8/1839 | House ........................... | 143/16 |
| 46,548 | 2/1865 | Dibble .......................... | 143/16 |

FOREIGN PATENTS

| 155,732 | 3/1939 | Austria ......................... | 143/16 |

*Primary Examiner*—Harold D. Whitehead
*Attorney*—Walter Fred

ABSTRACT: Mold plates of complex shape used for making hot pressed ceramic plates of similar configuration are cut out of a block of graphite with a saw blade preshaped lengthwise to a curvature of one radius or of different radii; oscillated a relatively short distance in a vertical plane and in an arc of fixed radius, about a horizontal axis. The block is supported on a member that can be fed horizontally into and pivoted about a vertical axis relative to the saw blade to produce a plate with straight and curved portions having a surface of substantially the curvature of the blade.

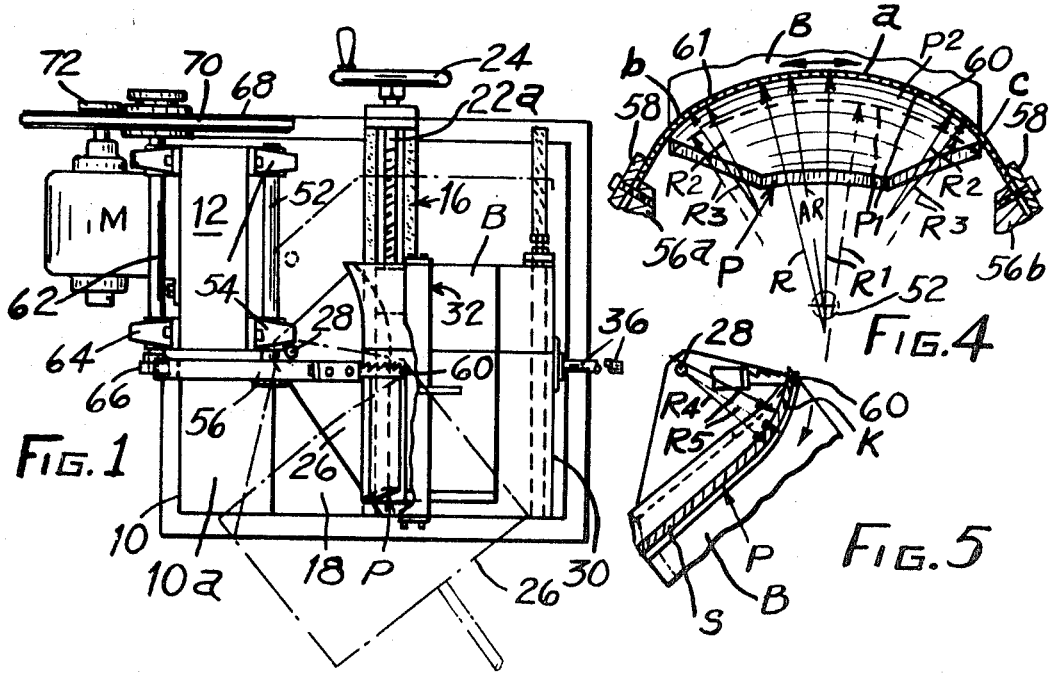
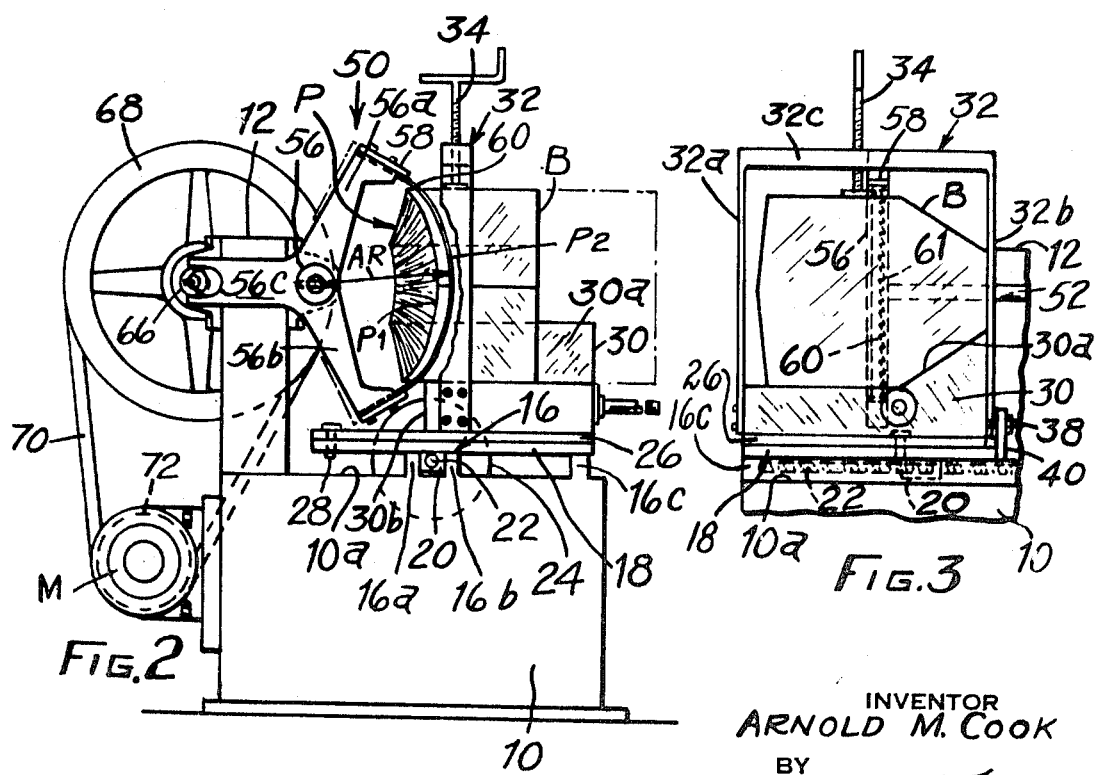

METHOD AND APPARATUS FOR CUTTING COMPLEX SHAPES

BACKGROUND OF THE INVENTION

The field of invention relates to cutting apparatus having a saw blade performed into arcs of different radii and designed to oscillate, about a pivot, in substantially the line of curvature of the saw blade; and means to feed and traverse, particularly a block of graphite or the like, in one or more directions relative to the performed saw blade and cut therefrom plates of complex shape.

IN THE PRIOR ART

Graphite mold plates used in making hot pressed ceramic plates of complex shape were either molded to form or machined out of individual plates utilizing more than one machine tool. These methods require considerably more time and energy and expensive apparatus compared to the applicant's more economical method and apparatus.

Noncontaminating graphite mold plates which can withstand the high temperatures and pressures are employed to hot press ceramic material into plates of high density. Frequently, many of the graphite mold plates can only be used once or twice under such severe conditions. Therefore, an economical method and apparatus for cutting large quantities of identical mold plates from large blocks of suitable graphite was developed by the applicant to maintain production of the ceramic plates.

SUMMARY OF THE INVENTION

A hard-toothed saw blade is preformed into a generally circular-shaped segment having a curvature of one or more different radii. The blade is fixed at opposite ends to spaced arms of a support frame oscillated, by a rotatable cam, in a vertical plane about a horizontal pivot shaft supported on an upwardly extending portion of a base adjacent to a traversable and pivotable work support. The saw blade is oscillated rapidly a short distance in and along a path, that is the average radius of curvature of the blade, to cut mold plates, having in one direction the curvature of the saw, from a block of graphite clamped onto the work support and traversed horizontally into the saw blade.

The work support is mounted on a horizontal table slidably mounted in a guideway on the base. A feed screw is provided for traversing the table, pivot, and the pivotable work support together in the guideway toward and away from the saw blade. The work support may be pivoted about a predetermined radius relative to the table at any point along the line of traverse to cut from the block of graphite supported thereon straight mold plates, curved mold plates, and mold plates having both a straight portion and a curved portion extending therefrom with surfaces, the curvature of the saw blade.

It is the primary object of the invention to provide a method and apparatus for economically sawing, out of graphite blocks, mold plates of complex shape used for making hot pressed ceramic plates of similar configuration.

Another object of the invention is to provide a method and apparatus for economically sawing, out of preformed block material, symmetrical plates of complex shape.

A further object of the invention is to provide a method and apparatus for sawing, out of block material, plates which have simultaneously cut concave and convex surfaces with more than one radius of curvature.

DESCRIPTION OF THE DRAWINGS

FIG. 1 is a plan view of the sawing apparatus of the invention;

FIG. 2 is a side view in elevation of the sawing apparatus of FIG. 1;

FIG. 3 is a partial front view in elevation of the sawing apparatus of FIG. 2;

FIG. 4 is an enlarged partial view showing the curvature of the saw blade and a complex shaped mold plate cut therewith; and FIG. 5 is a partial plan view partly in section showing the work support with the block of material thereon pivoted relative to the saw blade and the shape of a mold plate cut thereby.

DESCRIPTION OF THE PREFERRED EMBODIMENT

In the drawings is shown a base 10 having an upright portion of support bracket 12 at one side of the base and extending upwardly above a top surface 10a of the base 10. On the top surface 10a is slideway or guideway 16 comprising spaced horizontally extending slide or guide rails 16a, 16b, and 16c on which is slidably mounted a horizontal slide table 18 having a bottom surface engaging the rails.

The table has an elongated nut 20 extending downwardly between and in engagement with a side of each of the rails 16a and 16b by which the movement of the table is guided in a straight horizontal path on the base 10. It is obvious that other conventional slideways or guideways such as vee ways or a combination of vee and flat ways may be employed.

Although the table could be moved by hand, means for traversing the slide table 18 relative to the base 10 are provided and includes a rotatable feed screw 22 threaded through the nut 20 and having at least one end portion 22a journaled in the base and fixed against axial movement. A handwheel 24 is fixed to one end of the feed screw 22 and by which the feed screw may be rotated to traverse the nut and table together back and forth along the slideway 16. Alternatively, automatic and other well known power driven means may be utilized to rotate the screw 22.

A work support 26 is slidably mounted on the table 18 and movable with and pivotable relative thereto about the vertical axis of a pivot pin 28 extending through aligned holes in the work support and the table. The work support has a raised portion or filler block 30 fixed thereto with a surface 30a that conforms to the bottom surface of a preformed block of material, such as graphite, supported thereon.

The graphite block is advanced on the surface 30a so that a portion of the block B, from which mold plates P are cut, overhangs a side 30b of the filler block 30.

Means are provided for clamping the block of material in position and comprise a U-shaped frame 32 extending around the block B and fixed to opposite sides of the filler block 30 at end portions of downwardly extending legs 32a and 32b connected by a cross member 32c above the block. A clamp screw 34 with a lever handle thereon is threaded through the cross member 32c and has a flange for clamping engagement with the top of the block B.

A handle 36 is fixed to the filler block 30 and by which the work support 26, filler block, frame 32, clamp screw 34, and the block b can be pivoted together relative to the slide table 18 at any point along its path of travel. An adjustable stop screw 38 is threaded through a bracket 40 fixed to an end surface of the table 18 and limits the pivotable movement of the work support in one direction so that it can be aligned and traversed with the slide table 18.

Oscillating means 50 for sawing out mold plates P from the block B comprises a horizontal pivot or idler shaft 52 journaled in spaced bearing housings 54 fixed to a front surface of the upright portion 12 above the work support 30 and adjacent the block B. The axis of shaft 52 extends parallel to the guideway 16 and in a horizontal plane substantially midway between the tip and bottom surfaces of the block B. The pivot shaft 52 is fixed against axial movement in any well known manner and has an end portion projection beyond an end or side surface of the upright portion 12.

To the end portion of the horizontal pivot shaft 52 is fixed a Y-shaped saw head or frame 56 having a pair of angularly spaced saw blade support arms 56a and 56b and a lever arm 56c equally spaced therefrom extending radially from the axis of the pivot shaft 52. The arms 56a, 56b and 56c are pivotable in a vertical plane with the pivot shaft 52 and arranged with the lever arm 56c extending substantially horizontally on one side of the axis of the pivot shaft 52. On the opposite side of the pivot shaft axis the arm 56a extends above and opposite to the arm 56b which extends below the pivot axis. Each of the support arms 56a and 56b have a slot and clamps 58 by which each end of a rigid preformed saw blade 60 is fixed thereto.

As shown, the saw blade 60 has a thin narrow cross section with a plurality of hard cutting teeth 61 on at least one of its two vertically extending edges. It is formed along its length to the general contour of the mold plate P and obviously to which contour the side cutting edges of the teeth on opposite sides of blade conform.

Preferably, the saw blade 60 is about 1/8 inch thick, one half inch wide, and 24 inches long and has eight teeth per inch. The line of curvature of the saw blade includes tow or more arcs or segments of circles of different radii. It has a generally convex cutting side or outer surface which forms the inner concave surface $P^1$ of the mold plate P and a generally concave cutting side or inner surface which forms the convex outer surface $P^2$ of the mold plate P. Referring to FIG. 4, the saw blade has a central segment or arc shaped portion a with a concave cutting side or surface of radius R and a convex cutting side or surface of radius $R^1$ extending from a common axis or point.

Between the central segment a and the ends of the saw blade are identical segments or arc shaped portions b and c with concave surfaces of radius $R^2$ and a convex surface of radius $R^3$ extending from a common axis or point.

All of the convex and concave surfaces of different radii blend into each other and into the straight end portions clamped to the support arms 56a and 56b.

The thickness of the blade is the difference between the radius of the convex cutting side and the radius of the concave cutting side of each segment and one half the thickness of the blade added to the radius of the concave side is the means radius of each segment, a, b, and c.

It can be seen that the thickness of the mold plate P at the top and bottom surfaces is slightly thinner than at the center of the portion opposite saw segment a. This is due to the difference in radius between the convex and concave sides of the saw which simultaneously cuts a convex surface on one mold plate P and a concave surface on the block B and the next mold plate P cut therefrom.

Means are provided for rapidly oscillating the saw head 56 and saw blade 60 vertically about the axis of pivot shaft 52 a short distance in and along a single curved path that is the average radius of curvature AR of the saw blade 60 from the axis of pivot shaft 52. The average radius AR is a single radius which departs the least or a minimal amount from the curvature of the saw blade. The oscillating means comprises a second rotatable drive shaft 62 journaled in bearing housing 63 fixed to a back side on the upright portion 12. The axis of the drive shaft 62 is substantially parallel to and on the same horizontal plane as the axis of the pivot or idler shaft 52.

An eccentric wheel or cam 66 is fixed onto one end of the drive shaft 62 and engages opposed surfaces within an elongated slot in the end of the lever arm 56c of predetermined suitable length. The amount of eccentricity or distance between the axis of the wheel or cam 66 and the axis of rotation of shaft 62 is preferably very small and in this particular embodiment along 0.125 of an inch which moves the lever arm 0.125 of an inch above and below the horizontal axis of shaft 62 for a total distance of 0.250 of an inch. In this instance, the effective length of the lever arm 56c, that is the distance from the axis of pivot shaft 52 to the axis of rotation of the drive shaft 62, is slightly less than the distance and of average radius of curvature AR of the saw blade from the axis of the pivot shaft 52.

Therefore, the saw blade 60 will be moved slightly more than the lever arm 56c upon rotation of the cam 66. Obviously, no cutting action will be produced unless the saw blade is moved at least a distance greater than the pitch or distance between the cutting teeth thereon. In contrast, too much movement would produce a mold plate with an unacceptable contour substantially different than the desired and general contour of the saw blade 60. However, it is obvious that if the saw blade had a single radius of curvature extending from the axis of pivot shaft 52 that any amount of movement would reproduce the exact curvature of that particular saw blade on a mold plate cut therewith.

Fixed to the opposite end of drive shaft 62 is a relatively large pulley 68 about which is entrained a drive belt 70. The belt 70 extends about a pulley 72 fixed to the output shaft 74 of a drive motor M. Preferably, the pulleys 68 and 72 have a speed reducing ratio of 3 to 1 which produces approximately 600 oscillations of the saw blade and revolutions of shaft 62 per minute.

Various other types of drive means, such as gear, chain hydraulic, vibratory, pneumatic and variable speed reduction units may be used to oscillate the saw blade 60 at the desired rate.

Likewise, the saw blade 60 may be made of various rigid materials and various other cross-sectional shapes, such as, circular and square, with cutting teeth, abrasive particles, or combination thereof fixed thereto. The saw blade may be a hardened steel blade with a prescribed number of teeth per inch or a metal blank with diamonds or tungsten carbide teeth thereon. Obviously, other ceramic and abrasive materials, such as metal oxide, and carbides may be used to make the cutting elements, of the saw blade and attached thereto by various will known methods. The cutting element may be particles of hard material randomly distributed or equally spaced on the saw blade to provide a cutting edge thereon.

As shown the mold plate P has a longitudinally extending straight portion S and an integral curved portion K extending from the straight portion to one end of the plate P. Both the straight and curved portion have vertically extending concave and convex surface generated by the set cutting edges of the teeth 62 extending along the curved sides of the saw blade 60. In addition, the curved portion K has a horizontally extending convex surface of a radius $R^4$ and a concave surface of a radius $R^5$ extending from the common vertical axis of pivot pin 28, The axis of pivot pin 28 is fixed relative to the axis of pivot shaft 52 a predetermined distance from the saw blade 60. The distance from from the concave and convex surfaces of the saw blade 60 is respectively the radii $R^4$ and $R^5$ which are longest when measured along a horizontal plane passing through the axes of the pivot and drive shafts 52 and 63 and the mid plane or center line of symmetry of the mold plates P and block B.

The horizontally and vertically extending concave and convex surfaces of the curved portion blend into one another and into the vertically extending concave and convex surfaces of the longitudinally extending straight portion S. However, the length of radius $R^4$ and $R^5$ is gradually reduced when measured along parallel horizontal planes that are progressively further away from a plane on the axis of shafts 52 and 62. The gradual decrease in length of $R^4$ and $R^5$ is due to the curvature of the saw blade of which the ends are closer to the vertical axis of the pivot pin 28 than is its center.

In the particular embodiment shown the length of radii $R^4$ and $R^5$ on a first plane above axis of shaft 52 is equal to the length of radii $R^4$ and $R^5$ on a second plane that is the same distance below the axis of shaft 52 as is the first plane above the axis of shaft 52.

As shown in FIG. 5, the curved portion K also decreases in thickness and is thinnest at the side furthest away from the junction of the straight portion S therewith. This form is generated by the difference in length of the radii $R^4$ and $R^5$ and the saw simultaneously cutting a convex surface on one mold plate P and the concave surface on the block B and the next mold plate to be cut therefrom.

The operation of the sawing apparatus and the method of cutting mold plates P of the complex shape shown will now be described. A stock size rectangular block of graphite of predetermined length is first precut or preformed to the simple straight sided configuration shown in FIG. 3. Along its length and one side are two steep equally inclined converged surfaces and on the opposite side a pair of less steep equally inclined converging surfaces which extend to a flat vertical surface. The configuration of the block B is symmetrical about a horizontal plane midway its height and opposed parallel top and bottom surfaces which intersect the converging surfaces substantially on the vertical axis of the pivot pin 28.

The filler block 30 is made to conform to one side of the block B and at a height which will support the block with its horizontal plane of symmetry substantially on the horizontal axis of the pivot shaft 52. Table 18 is positioned at one side of the saw blade 60. The block is then advanced the desired thickness of the mold plate beyond the concave surface of the saw blade 60 and overhanging the side 30b of filler block 30. The preformed block B is then clamped to the filler block on the pivotable work support 26 and with an end of the graphite block B aligned with the side of the filler block engaged by the screw 38.

Motor M is started whereby the saw head and saw blade 60 is oscillated about the axis of pivot shaft 52. Handwheel 24 is rotated to rotate screw 22 and traverse the slide table, pivotable work support and block B into the cutting edge of the saw blade. The block B is traversed in a horizontal plane and substantially parallel to the axis of pivot shaft 52 until the vertical axis of the pivot pin 28 is aligned with the cutting edge of the saw blade 60. The operator then grasps the handle 36 and slowly swings work support 26 and block B about the axis of pivot pin 28 relative to the table to cut the curved portion K of fixed radii R and R tangent with the previously cut straight longitudinal portion S. Both the straight and the integral curved portions have substantially the curvature of the saw blade 60. In this embodiment, the curved portion K of the mold plate P begins at the intersection of the parallel top and bottom surfaces with the converging surfaces and gets narrower towards the flat vertical surface. As a result, the curvature produced by segments b and c of saw blade 60 gradually diminish to a plane from which only the curvature of segment of a the saw blade 60 is reproduced on the remainder of the curved portion K of the mold plate P.

The following is a typical example of a complex mold plate produced by the invention. The mold plate was 16 inches long by 13½ inches in height or width. The configuration of the mold plate P cut by an one-eighth of an inch thick saw blade was symmetrical and included a radius R of 11½, a radius $R^1$ of 11⅝ inches, radii $R^2$ of 5¼ inches, radii $R^3$ of 5⅜ inches and was 1 inches thick at the horizontal plane of symmetry. It had a straight portion S 9 11/16 inches long and a curved portion K with a radius $R^4$ of 8¾ inches and a radius $R^5$ of 8⅞ inches.

The average radius of curvature of the saw blade AR from the horizontal pivot was 9¼ inches, and the saw blade was oscillated one-eighth of an inch above and below the horizontal axis and plane of symmetry.

The machine may be operated and modified in various ways to produce plates of various shapes. For example, the pivotable axis of pivot pin 28 may be relocated in any number of places to produce different radii of curvature on the plates. Also, the stop screw 38 and its support bracket 40 may be removed to allow the work support table to be pivoted there beyond in order to cut from the block B plates of continuous and constant radius of curvature in the horizontal plane.

Also, it is conceivable to modify the apparatus so that plates may be cut to have a portion of constantly varying radius of curvature in the horizontal plane instead of a straight portion S. It could be accomplished by simultaneously traversing and pivoting the block B at predetermined rates relative to the saw blade.

Obviously, saw blades of different curvatures may be utilized and the saw head 56 modified to accommodate them.

The machine may be, if desired, made fully automatic by the addition of various well known mechanisms which, for example, intermittently feed and clamp the block B, retract and advance the slide table, stop the table traverse to pivot the work support 26 at the proper time, and then returned to be recycled.

As many modifications of invention may be made without departing from the spirit and scope of the invention, it is to be understood that the embodiment shown in the drawings and described hereinabove are to be considered as illustrative and limited only by the scope of the appended claims.

What I claim is:

1. Apparatus for cutting plates of complex shape from a block of material comprising:
   a base having an upright portion extending therefrom and a guideway adjacent the upright portion;
   a means slidably mounted on the base and movable horizontally along the guideway, for supporting the block of material;
   means for clamping the block of material to the block-supporting means;
   means, including a preformed saw blade of predetermined length and curvature having a concave side of more than one radius of curvature along its length and a convex side substantially parallel to the concave side, for sawing into the block of material, pivotally mounted on the upright portion for vertical movement about a horizontal axis situated above the block supporting means and parallel to the guideway with the length and curvature of the saw blade extending vertically adjacent the upright portion and movable in an arc having an average radius of curvature of the saw blade from the horizontal axis;
   means for oscillating the saw blade a relatively short distance on the arc about the horizontal axis; and
   means for traversing the block supporting means with the block of material along the guideway relative to the base and the saw blade;
   whereby plates each having surfaces of substantially the curvature of the saw blade may be cut from the block of material and the saw blade simultaneously cuts a convex surface on the plate substantially the curvature of the concave side and a concave surface on the block and the next plate cut there-from substantially the curvature of the convex side.

2. Apparatus for cutting plates of complex shape from a block of material according to claim 1 wherein the block-supporting means comprises:
   a table slidably mounted on the base;
   a work support pivotally mounted on the table and onto which the block of material is clamped by the clamping means, for horizontal movement with the table and relative to the table about a vertical axis;
   means for moving the work support together with the table along the guideway relative to the base and the saw blade; and
   means for pivoting the work support about the vertical axis, relative to the table and the saw blade;
   whereby straight plates, curved plates, and plates with integral straight and curved portions having a surface of substantially the curvature of the saw blade may be cut from the block of material.

3. Apparatus for cutting plates of complex shape from a block of material according to claim 1 further comprising:
   a pivot shaft on the upright portion coaxial with the horizontal axis and on which is mounted the sawing means.

4. Apparatus for cutting plates of complex shape from a block of material according to claim 3 wherein the sawing means comprises:
   a saw frame having a pair of angularly spaced arms extending radially, one above and one below the horizontal axis, at one side of the pivot shaft, adjacent the block of material;
   a lever arm fixed relative to the arms and engaged by the means for oscillating the sawing means and the saw blade about the horizontal axis; and means, on the angularly spaced arms, for attaching opposite end portions of the saw blade to the saw frame.

5. Apparatus for cutting plates of complex shape from a block of material according to claim 4 wherein the curvature of the saw blade is symmetrical on opposite sides of a plane passing midway the ends of the blade and through the horizontal axis; and wherein the block of material on the work support has a configuration that is symmetrical above and below a horizontal plane on the horizontal axis; whereby plates cut from the block have a corresponding symmetrical configuration.

6. Apparatus for cutting plates of complex shape from a block of material according to claim 5 wherein the oscillating means comprises;
  an eccentric cam of predetermined eccentricity rotatably mounted on the upright portion and engaging the lever arm a predetermined distance from the horizontal axis; and
  means for rotating the eccentric cam at a predetermined rate;
  whereby the saw blade is oscillated on the arc an equal distance above and below the horizontal plane on the horizontal axis.

7. Apparatus for cutting plates of complex shape from a block of material according to claim 6 wherein the eccentric cam has an eccentricity of an amount which oscillates the saw blade on the arc less than one-fourth of an inch above and below the horizontal plane on the horizontal axis; and
  the lever arm has an elongated slot at the end portion into which the eccentric cam extends and engages opposed side surfaces of the lever arm within the slot.

8. A method of cutting plates of complex shape from a block of material comprising the steps of:
  forming a saw blade to a predetermined curvature that provides the blade with substantially a concave side of more than one radius of curvature along its length and a convex side substantially parallel to the concave side;
  supporting the saw blade at its opposite ends;
  oscillating the saw blade lengthwise a relatively short distance in an arc which is the average radius of curvature of the blade; and
  moving the oscillating saw blade and the block or material relative to each other in a predetermined path through the block;
  whereby the saw blade simultaneously cuts a convex surface on the plate substantially the curvature of the concave side and a concave surface on the block and the next plate cut therefrom substantially the curvature of the convex side.

9. A method of cutting plates of complex shape from a block of material according to claim 8 wherein the forming step further comprises:
  providing the blade with a curvature which is symmetrical about a plane midway its ends.

10. A method of cutting plates of complex shape from a block of material according to claim 9 further comprising the steps of:
  providing a block of material having a configuration that is symmetrical about one plane; and
  aligning the plane of symmetry of the block with the plane of symmetry of the saw blade.

11. A method of cutting plates of complex shape from a block of material according to claim 10 wherein the saw blade is oscillated an equal distance each side of the plane of symmetry of the block.

12. A method of cutting plates of complex shape from a block of material according to claim 11 wherein the predetermined path of relative movement is straight and curved;
  whereby plates with straight and curved portions having a surface substantially the curvature of the saw blade are cut from the block of material.

13. Apparatus according to claim 1 wherein the plates are mold plates and the block of material is graphite.

14. A method according to claim 8 wherein the plates are mold plates and the block of material is graphite.